(12) United States Patent
Shani et al.

(10) Patent No.: US 11,119,899 B2
(45) Date of Patent: Sep. 14, 2021

(54) DETERMINING POTENTIAL TEST ACTIONS

(71) Applicant: ENTIT Software LLC, Sunnyvale, CA (US)

(72) Inventors: Inbar Shani, Yehud (IL); Amichai Nitsan, Yehud (IL); Yaron Burg, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 557 days.

(21) Appl. No.: 15/574,370

(22) PCT Filed: May 28, 2015

(86) PCT No.: PCT/US2015/032814
§ 371 (c)(1),
(2) Date: Nov. 15, 2017

(87) PCT Pub. No.: WO2016/190869
PCT Pub. Date: Dec. 1, 2016

(65) Prior Publication Data
US 2018/0137036 A1 May 17, 2018

(51) Int. Cl.
*G06F 9/44* (2018.01)
*G06F 11/36* (2006.01)
(Continued)

(52) U.S. Cl.
CPC ............ *G06F 11/3684* (2013.01); *G06F 8/34* (2013.01); *G06F 8/71* (2013.01); *G06F 11/3688* (2013.01); *G06F 11/3692* (2013.01)

(58) Field of Classification Search
CPC ......... G06G 8/65; G06F 8/71; G06F 11/3664; G06F 11/3688; G06F 3/123; G06F 8/70;
(Continued)

(56) References Cited

U.S. PATENT DOCUMENTS 7,814,378 B2 10/2010 Manovit et al.
7,823,100 B1 10/2010 Hamid et al.
(Continued)

FOREIGN PATENT DOCUMENTS

WO WO-2014021872 A1 2/2014

OTHER PUBLICATIONS

International Searching Authority., International Search Report and Written Opinion dated Mar. 31, 2016 for PCT Application No. PCT/US2015/032814 Filed May 28, 2015, 10 pages.
(Continued)

*Primary Examiner* — Tuan A Vu

(57) ABSTRACT

Example implementations relate to determining potential test actions. Some implementations may include a data capture engine to capture data points during test executions of the application under test. The data points may include, for example, test action data and application action data. Additionally, some implementations may include a data correlation engine to correlate each of the data points with a particular test execution of the test executions, and each of the data points may be correlated based on a sequence of events that occurred during the particular test execution. Furthermore, some implementations may also include a test verification engine to determine, based on the correlation of the data points, a potential test action to perform during a future test execution of the application under test.

15 Claims, 7 Drawing Sheets

(51) Int. Cl.
*G06F 8/34* (2018.01)
*G06F 8/71* (2018.01)

(58) Field of Classification Search
CPC ...... G06F 21/50; G06F 3/0611; G06F 21/554;
G06F 11/368; G06F 11/3684
See application file for complete search history.

(56) References Cited

U.S. PATENT DOCUMENTS

| | | | |
|---|---|---|---|
| 8,006,233 B2 | 8/2011 | Centonze et al. | |
| 8,214,421 B2 | 7/2012 | Cherian et al. | |
| 8,615,739 B2 | 12/2013 | Nir | |
| 9,183,387 B1* | 11/2015 | Altman | G06F 21/554 |
| 9,727,447 B1* | 8/2017 | Elgarat | G06F 11/3672 |
| 2006/0294507 A1* | 12/2006 | Buskens | G06F 9/5066 |
| | | | 717/133 |
| 2007/0283322 A1* | 12/2007 | Hsu | G06F 8/34 |
| | | | 717/113 |
| 2009/0133006 A1* | 5/2009 | Cheung | G06F 8/71 |
| | | | 717/144 |
| 2010/0146487 A1 | 6/2010 | Chun et al. | |
| 2010/0235816 A1 | 9/2010 | Sharma et al. | |
| 2013/0055029 A1* | 2/2013 | Lawrance | G06F 11/3684 |
| | | | 714/38.1 |
| 2014/0109063 A1* | 4/2014 | Schissel | G06F 11/368 |
| | | | 717/127 |
| 2014/0282425 A1 | 9/2014 | Zhao et al. | |
| 2015/0074648 A1 | 3/2015 | Tal et al. | |
| 2015/0086115 A1 | 3/2015 | Danko | |
| 2015/0100830 A1 | 4/2015 | Nanjundappa et al. | |
| 2015/0347282 A1* | 12/2015 | Wingfors | G06F 11/3688 |
| | | | 717/125 |
| 2016/0117118 A1* | 4/2016 | Martinez | G06F 3/0611 |
| | | | 711/162 |

OTHER PUBLICATIONS

Owen, Gene, SearchSoftwareQuality, App performance monitoring closes gap between testing and production dated on or before May 21, 2015 (7 pages).

Software Testing Help, Software Testing Guide, Test Result Analysis and Reports—Load Testing with LoadRunner Tutorial #8 dated on or before Apr. 23, 2015 (10 pages).

* cited by examiner

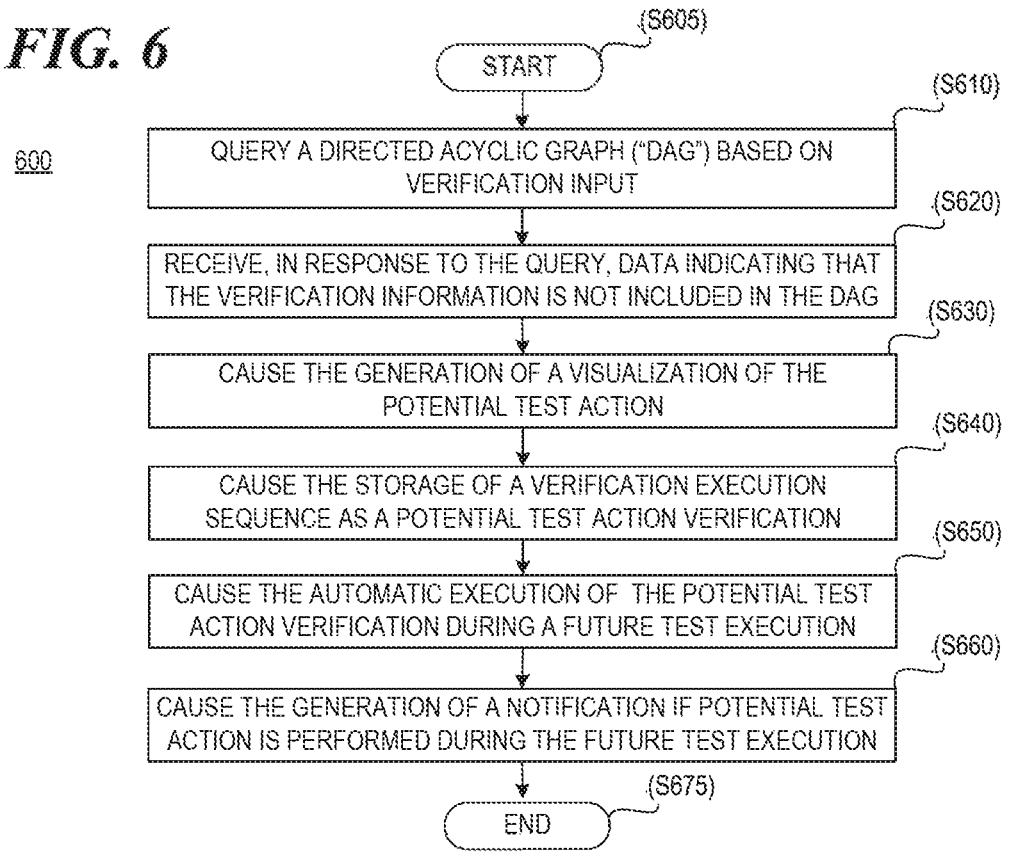
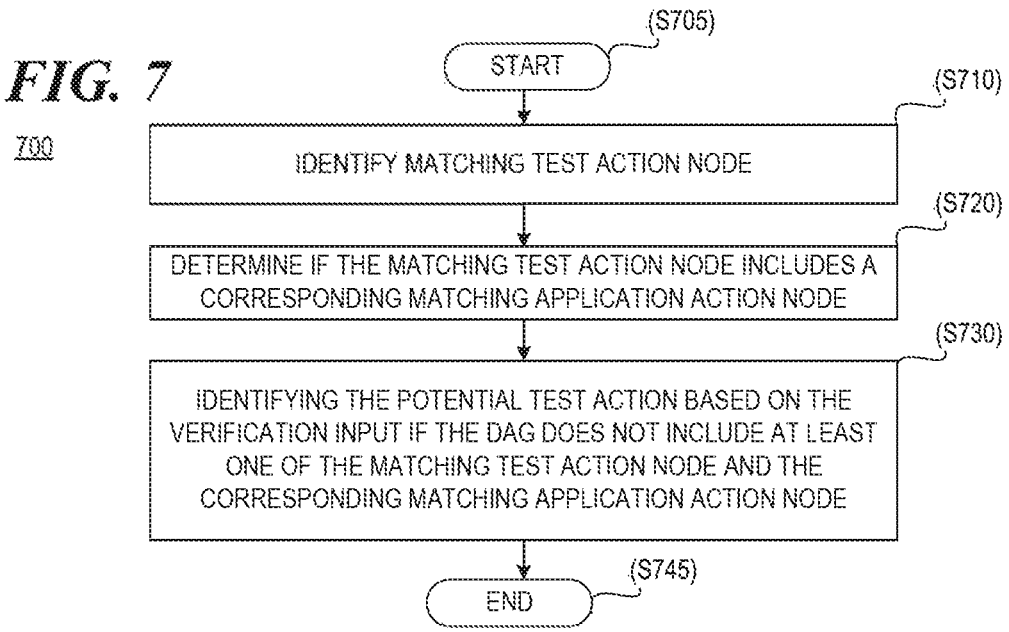

DETERMINING POTENTIAL TEST ACTIONS

BACKGROUND

Application testing may be performed to provide information about an application under test ("AUT"). For example, application testing may be performed to determine whether the AUT includes any errors or other defects. While various techniques are available for application testing, basic application testing procedures may involve two main types of test steps: (1) action steps which manipulate, drive, or query an application under test ("AUT"); and (2) verification steps which verify the expected outcomes associated with the action steps.

BRIEF DESCRIPTION OF THE DRAWINGS

The following detailed description references the drawings, wherein:

FIG. 6 is a flow chart of an example process for determining potential test actions consistent with disclosed implementations;

FIG. 7 is a flow chart of an example process for identifying potential test actions consistent with disclosed implementations;

DETAILED DESCRIPTION

Figure 1:
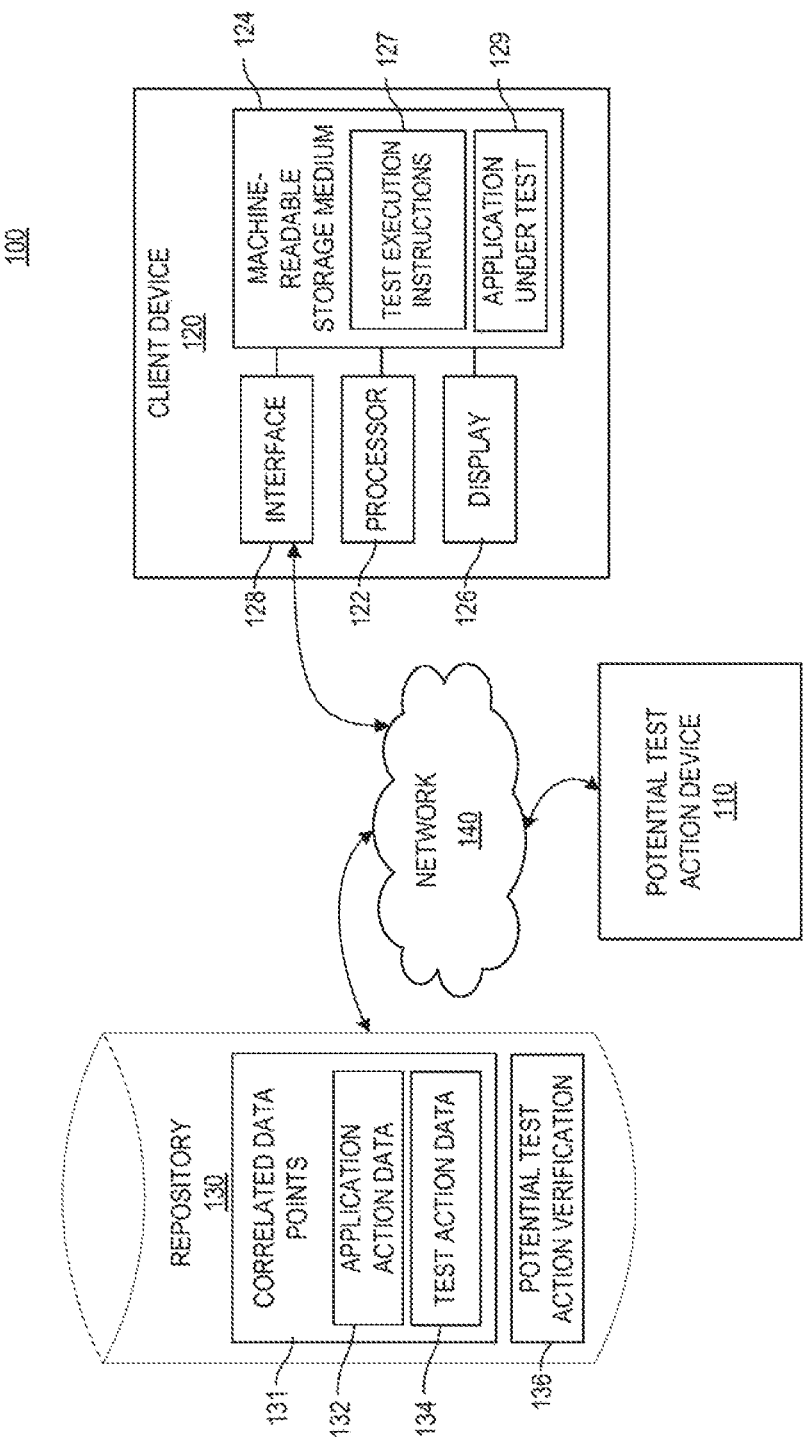
FIG. 1 is a block diagram of an example system for determining potential test actions consistent with disclosed implementations.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As discussed above, basic application testing procedures may involve two main types of test steps: (1) action or test steps which manipulate, drive, or query an application under test ("AUT"); and (2) verification steps which verify the expected outcomes associated with the action steps. Traditionally, this basic application testing procedure may create a dependency between the actions and verifications. For example, the verifications may need to be performed during the execution of the test of the AUT. This dependency may have several shortcomings, including the need to re-run a test execution of an AUT when the verification changes (even if the actions have not changed), a tendency to only verify what is being acted upon (e.g., if the action is to click a button, a user will verify that the button has been clicked), difficulty correlating action step outcomes with events at other levels of the AUT (e.g., server logs, database logs, application logs, etc.), and various maintenance challenges based on changed actions and/or changed verifications. For example, consider the case where an AUT is a banking application and the test case is determining whether funds are transferred from a first account ("Account A") to a second account ("Account B"). A tester may execute the test case to perform the fund transfer and verify that the transferred amount is indeed added to Account B. After completing the test, the tester has decided that another verification is needed—verifying that a sign on procedure has been performed. To execute that new verification, the tester may need to revise the test to include a test action related to the sign on procedure, discard the previously-executed results, run or re-run each of the action steps, and then verify the results of each of the action steps during the execution of the revised test. Such errors can be a waste of a tester's time and resources.

Some examples disclosed herein may help avoid the need to revise and re-execute a test by separating test actions from test verifications. As the test actions are separated from the test verifications, examples disclosed herein can identify potential test actions that can be performed and verified in the future. A potential test action may be an unperformed test action that is capable of being performed during future test executions of an application under test. To identify potential test actions, some examples may monitor and capture data points from test executions of an AUT as well as define, persist, and execute queries of these data points. The queries may be considered to be a new method of defining expected application behavior, and may serve as the verification steps in traditional scripts. For example, examples consistent with disclosed implementations may capture data points during test executions of an AUT, correlate each of the data points with a particular test execution of the AUT, and determine, based on the correlation of the data points, a potential test action to perform during a future test execution of the AUT.

Referring now to the drawings, FIG. 1 is a block diagram of an example system 100 for determining potential test actions. System 100 may be implemented in a number of different configurations without departing from the scope of the disclosed examples. In the example shown in FIG. 1, system 100 may include a potential test action device 110, a client device 120, a repository 130, and a network 140 for connecting potential test action device 110 with client device 120 and/or repository 130.

Potential test action device 110 may be a computing system that performs various functions consistent with disclosed examples. For example, potential test action device 110 may be a server, a desktop computer, a laptop computer, and/or any other suitable type of computing device. In some examples, potential test action device 110 may process information received from client device 120 and/or repository 130. For example, potential test action device 110 may determine potential test actions based on data captured from client device 120 and/or received from repository 130. Examples of potential test action device 110 and certain functions that may be performed by device 110 are described in greater detail below with respect to, for example, FIGS. 2-10.

Client device 120 may be a computing system operated by a user. For example, client device 120 may be a desktop computer, a laptop computer, a tablet computing device, a mobile phone, and/or any other suitable type of computing device. In some examples, client device 120 may be a computing device to perform operations consistent with certain disclosed implementations. For example, client device 120 may be adapted to transmit data related to test executions of an AUT to potential test action device 110, such as, for example, data related to action steps performed during application testing.

Client device 120 may include a processor to execute instructions stored in a machine-readable storage medium. In the example shown in FIG. 1, client device 120 may include a processor 122, a machine-readable storage medium 124, a display device 126, and an interface 128. Processor 122 of client device 120 may be at least one processing unit (CPU), microprocessor, and/or another hardware device to execute instructions to perform operations. For example, processor 122 may fetch, decode, and execute instructions stored in machine-readable storage medium 124 (such as test execution application instructions 127 and/or AUT instruction 129) to test an AUT. While in the example shown in FIG. 1 the AUT resides on client device 120, test execution instructions 127 and/or the AUT 129 may reside on different machines and/or may span multiple computing systems. Machine-readable storage medium 124 may be any electronic, magnetic, optical, or other non-transitory storage device, that stores instructions executed by processor 122. Display 126 may be any type of display device that presents information, such as a user interface of an AUT, a test verification interface, and the like, to a user (e.g., a tester) operating client device 120. Interface 128 may be any combination of hardware and/or programming that facilitates the exchange of data between the internal components of client device 120 and external components, such as potential test action device 110. In some examples, interface 128 may include a network interface device that allows client device 120 to receive and send data to and from various components, such as to and from potential test action device 110 via network 140.

Repository 130 may be any type of storage system configuration that facilitates the storage of data. For example, repository 130 may facilitate the locating, accessing, and retrieving of data points captured during test executions of an AUT (e.g., SaaS, SQL, Access, etc. databases). Repository 130 can be populated by a number of methods. For example, potential test action device 110 may populate repository 130 by receiving, generating, and/or otherwise accessing data related to the potential test actions (e.g., potential test action verifications) storing the data in repository 130. As another example, potential test action device 110 may populate repository 130 with data points captured and correlated by potential test action device 110, and store the correlated data points in repository 130. In some implementations, the data points may be stored as a directed acyclic graph ("DAG"). Traditionally, a DAG is a directed graph formed by a collection of vertices (e.g., a fundamental unit of which the graph is formed) and directed edges (e.g., an edge that points from a first vertex the collection of vertices to a second vertex in the collection of vertices). A DAG, as used herein, doesn't necessarily mean a graphic representation of the data included in a traditional DAG. Instead, a DAG as used herein may include the graphic representation and/or a data structure that stores the data points in a manner that allows system 100 to determine data represented by the traditional DAG (e.g., categorization of the data points, directed edges associated with particular data points, and/or vertices associated with the data points).

In some examples, the data structure may be an array, a record, a database entry, a lookup table, a hash table, a map, a tree, a linked list, and/or any other type of data structure. An example of a DAG consistent with disclosed implementations is discussed in more detail below with respect to, for example, FIG. 5.

While in the example shown in FIG. 1 repository 130 is a single component external to components 110 and 120, repository 130 may comprise separate components and/or may be part of devices 110, 120, and/or another device. In some implementations, repository 130 may be managed by components of device 110 and/or other devices that are capable of accessing, creating, controlling and/or otherwise managing data remotely through network 140.

Network 140 may be any type of network that facilitates communication between remote components, such as potential test action device 110 and client device 120. For example, network 140 may be a local area network (LAN), a wide area network (WAN), a virtual private network, a dedicated intranet, the Internet, and/or a wireless network.

The arrangement illustrated in FIG. 1 is simply an example, and system 100 may be implemented in a number of different configurations. For example, while FIG. 1 shows one potential test action device 110, client device 120, repository 130, and network 140, system 100 may include any number of components 110, 120, 130, and 140, as well as other components not depicted in FIG. 1. For example, system 100 may omit any of components 110, 120, 130, and 140, and/or the functionality of at least one of components 110, 120, 130, and 140 may be incorporated into another component (e.g., components 110, 120, 130, 140, and/or a component not shown in FIG. 1).

Figure 2:
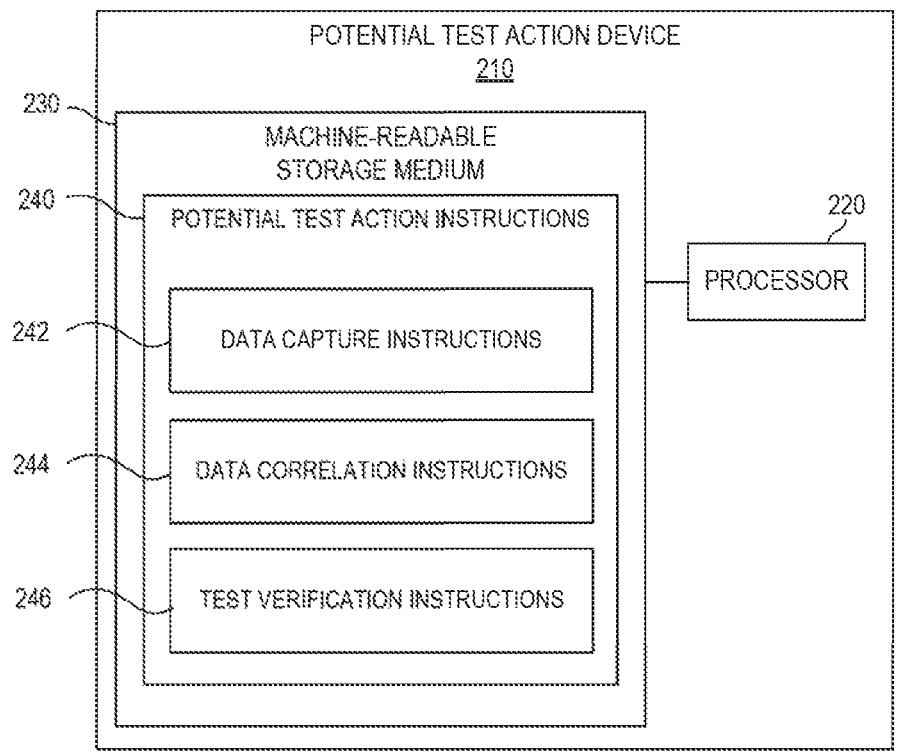
FIG. 2 is a block diagram of an example potential test action device consistent with disclosed implementations.

FIG. 2 is a block diagram of an example potential test action device 210 consistent with disclosed implementations. In certain aspects, potential test action device 210 may correspond to potential test action device 110 of FIG. 1. Potential test action device 210 may be implemented in various ways. For example, device 210 may be a special purpose computer, a server, a mainframe computer, and/or any other suitable type of computing device. In the example shown in FIG. 2, potential test action device 210 may include a processor 220 and a machine-readable storage medium 230.

Processor 220 may be at least one processing unit (CPU), microprocessor, and/or another hardware device to execute instructions to perform operations. For example, processor 220 may fetch, decode, and execute identification instructions 240 (e.g., instructions 242, 244, and/or 246) stored in machine-readable storage medium 230 to perform operations consistent with disclosed examples.

Machine-readable storage medium 230 may be any electronic, magnetic, optical, and/or other physical storage device that stores executable instructions. Thus, machine-readable storage medium 230 may be, for example, memory, a storage drive, an optical disc, and the like. In some implementations, machine-readable storage medium 230 may be a non-transitory machine-readable storage medium where the term "non-transitory" does not encompass transitory propagating signals. Machine-readable storage medium 230 may be encoded with instructions that, when executed by processor 230, perform operations consistent with disclosed implementations. For example, machine-readable storage medium 240 may include instructions that perform operations to determine potential test actions by capturing data points during test executions of an AUT, correlating each of the data points with a particular test execution of the AUT, and determining potential test actions of the test executions based on the correlation of the data points. In the example shown in FIG. 2, machine-readable storage medium 230 may include data capture instructions 242, data correlation instructions 244, and test verification instructions 246.

Data capture instructions 242 may function to capture data points during test executions of an AUT. In some implementations, when data capture instructions 242 are executed by processor 220, data capture instructions 242 may cause processor 220 and/or another processor to capture data points during test executions of the AUT. For example, data capture instructions 242 may cause processor 220 and/or another processor to access, receive, or otherwise obtain the data points from one or more computing systems that execute the test and/or implement the AUT during the test executions. In some examples, the data points may be captured by installing agents on various physical or virtual system components to monitor how the particular component(s) function and to transmit the data points to a storage device, such as a storage device associated with potential test action device 110. The transmitted data points may then be received and/or captured by potential test action device 110. The agents may be simple (e.g., agents monitoring a central processing unit ("CPU") that may simply ask an operating system what the CPU use level is) or complex (e.g., agents integrated with a testing tool that follow all of the test steps during test executions of an AUT). Alternatively (or in combination with the use of agents) the information may be monitored agentlessly. For example, a monitoring server may query various component(s) for information about the component(s) memory usage.

In some implementations, the captured data points may include application action data that includes data related to actions performed by the application under test in response to test actions performed during the test executions, the application action data may include data related to various levels of the AUT, such as a user interface level (e.g., UI snapshots, UI object extractions, etc.), a code level (e.g., code executed behind the UI), a network communication level (e.g., network communications between client device 120 and potential test action device 110), a database level (e.g., databases accessed by the AUT during test execution), and an environment level (e.g., data related to the environment of the AUT such as data related to hardware (e.g., device build, CPU usage, memory usage, resource usage, etc.) and programming (e.g., operating system, browser, etc.) that are related to the execution of the test of the AUT (e.g., server logs) and/or that relate to the execution of the AUT itself (e.g., application server errors)). In some examples, the captured data points may include test action data that includes data related to the test actions performed during the test executions, such as test actions and/or steps performed during the particular test execution state (e.g., start test step (e.g., data indicating that the data point is related to the start of a test step), end test step (e.g., data indicating that the data point is related to the end of a test step), report test result step (e.g., data indicating that the data point is related to a particular result of a test step), complete test step (e.g., data indicating that the data point is related to the completion of an entire test), and/or a report test step (e.g., data indicating that the data point relates to reporting the results on the entire test)), and/or metadata related to the AUT (e.g., AUT version), the particular test execution state (e.g., test date/time, tester name, etc.), and the like. Examples of capturing data points during test executions of an AUT are described in further detail below with respect to, for example, FIGS. 2-10.

Data correlation instructions 244 may function to correlate data points. For example, when data correlation instructions 244 are executed by processor 220, data correlation instructions 244 may cause processor 220 to correlate each of the data points with a particular test execution of the AUT. In some implementations, the data points may be correlated based on a sequence of events that occurred during the particular test execution. For example, data correlation instructions 244 may cause processor 220 to generate a DAG and/or store the data in a manner that allows contextual queries of the data. In some examples, the DAG and/or the correlated data may be stored in a repository, such as repository 130. Examples of correlating data points are described in further detail below with respect to, for example, FIGS. 4 and 5.

Test verification instructions 246 may function to determine, based on the correlation of the data points, a potential test action to perform during a future test execution of the AUT. In some implementations, the potential test action may be an unperformed test action that is capable of being performed during a future test execution of the AUT. For example, when test verification instructions 246 are executed by processor 220, test verification instructions 246 may cause processor 220 to determine a potential test action by querying a DAG based on a verification input (e.g., input to verify results of one or more historical test executions of an AUT) and receiving, in response to the query, data indicating that at least one of a test action and an application action represented by the verification input is not included in the DAG. Examples of determining potential test actions are described in further detail below with respect to, for example, FIGS. 6-9.

Figure 3:
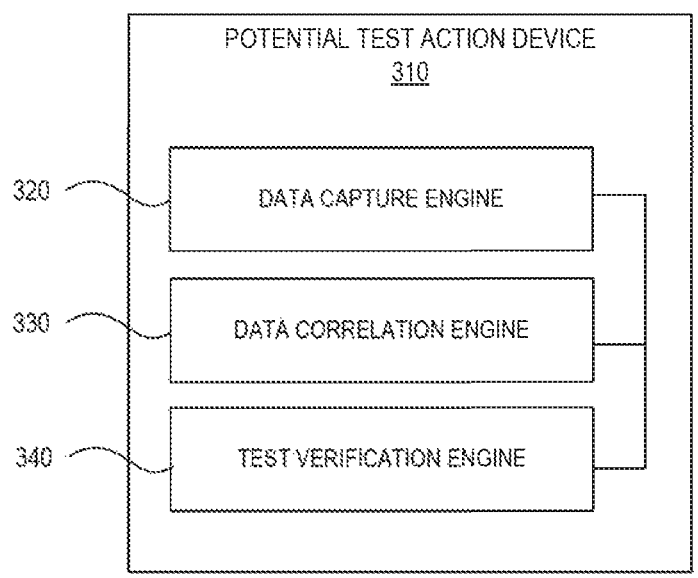
FIG. 3 is a block diagram of an example potential test action device consistent with disclosed implementations.

FIG. 3 is a block diagram of an example potential test action device 310 consistent with disclosed implementations. In certain aspects, potential test action device 310 may correspond to potential test action device 110 of FIG. 1 and/or potential test action device 210 of FIG. 2. Device 310 may be implemented in venous ways. For example, device 310 may be a special purpose computer, a server, a mainframe computer, and/or any other suitable type of computing system. In the example shown in FIG. 3, device 310 may include a data capture engine 320, a data correlation engine 330, and a test verification engine 340.

Engines 320, 330 and 340 may be electronic circuitry for implementing functionality consistent with disclosed examples. For example, engines 320, 330, and 340 may represent combinations of hardware devices and programming to implement the functionality consistent with disclosed implementations. In some examples, the functionality of engines 320, 330, and/or 340 may correspond to operations performed by potential test action device 210 of FIG. 2, such as operations performed when identification instructions 240 are executed by processor 220 (described above with respect to FIG. 2). In FIG. 3, data capture engine 320 may represent a combination of hardware and programming that performs operations similar to those performed when processor 220 executes data capture instructions 242. Similarly, data correlation engine 330 may represent a combination of hardware and programming that performs operations similar to those performed when processor 220 executes data correlation instructions 244, and test verification engine 340 may represent a combination of hardware and programming that performs operations similar to those performed when processor 220 executes test verification instructions 246.

Figure 4:
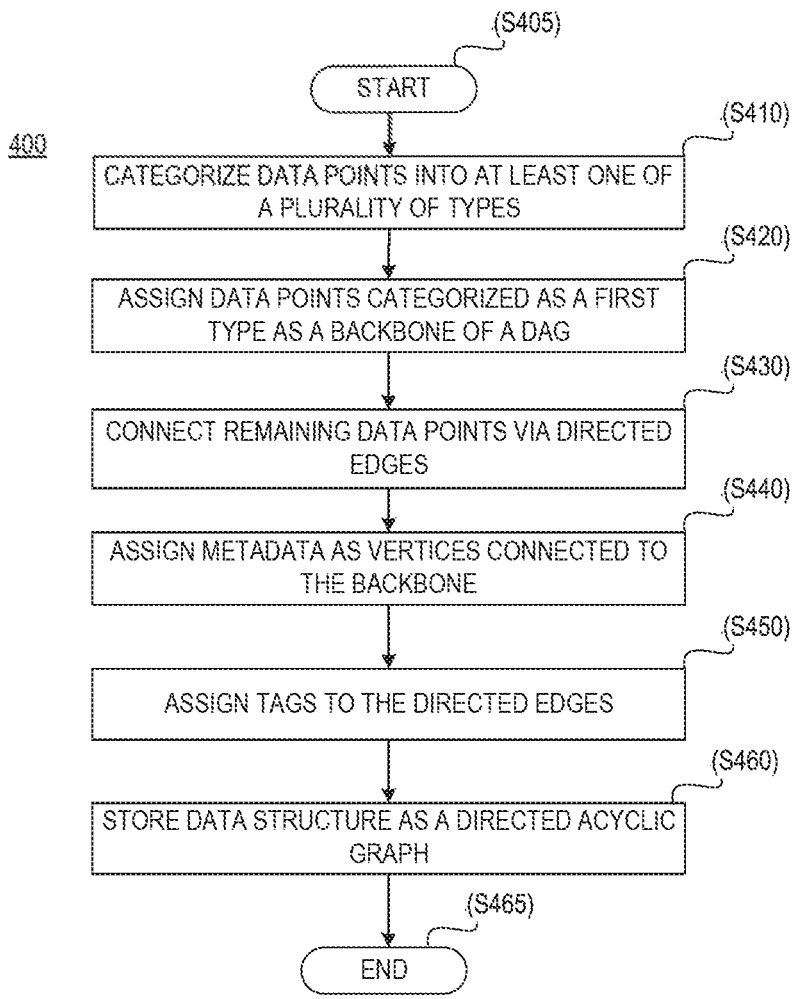
FIG. 4 is a flow chart of an example process for correlating data points consistent with disclosed implementations.

FIG. 4 is a flow chart of an example process 400 for correlating data points consistent with disclosed implementations. Although execution of process 400 is described below with reference to system 100 of FIG. 1 and/or specific components of system 100, other suitable systems and devices for execution of at least one step of process 400 may be used. For example, processes described below as being performed by potential test action device 110 may be performed by potential test action device 210, potential test action device 310, and/or any other suitable device. Process 400 may be implemented in the form of executable instructions stored on a machine-readable storage medium and/or in the form of electronic circuitry.

Process 400 may start (step S405) after data points have been captured during test executions of an AUT. Once the data points have been captured, process 400 may function to correlate each of the data points by generating a DAG, such as DAG 500 of FIG. 5. In some implementations, the DAG may be generated based on timestamps associated with the data points, and may include a plurality of test action nodes and a plurality of application action nodes. For example, process 400 may include categorizing the data points into at least one of a plurality of types (step S410). For example, the data points may be categorized based on steps of the test execution, data type (e.g., CPU, memory, UI object, user action, network packet, etc.), a particular user (e.g., an identify of the user who was running the test), AUT build (the specific build version of the AUT when the data points were captured), and/or any other suitable categorization. In some implementations, the plurality of types may include a first type. For example, the first type may be test actions of the test execution such as, for example, steps involved in tester interaction with a user interface of the AUT. As another example, the first type may be application actions of the test execution such as, for example, actions of the AUT that are performed in response to the test actions. The definition of the particular types may be predetermined, or may be based on input from a user. For example, a user may define the application action type as all actions completed by the AUT between a test action and a full update to a user interface (e.g., may transmit the user interface has been updated such that all of the text and/or graphics have fully loaded) of the AUT.

Process 400 may also include assigning data points categorized as the first type as a backbone of a DAG (step S420). For example, system 100 may assign the data points associated with test steps of the test execution as a backbone of the DAG. The data points associated with test steps (e.g., backbone nodes) may be considered to be test action nodes, and the data points associated with application actions may be considered to be application action nodes.

Process 400 may also include connecting remaining data points (e.g., a set of the data points that are not categorized as the first type) via directed edges based on timestamps associated with the remaining data points (step S430). For example, the data points may be connected via directed edges from a first data point of the first type (e.g., a first test step of the test steps). In some examples, the data points may be connected based on a length of time between a time stamp associated with a particular data point of the captured data points, and a time stamp associated with the first test step. For example, system 100 may order the test steps in the backbone sequentially based on when the test steps were executed. Events associated with a particular test step may be traced and associated with the particular test step. For example, system 100 may trace UI objects. A UI scanner may run periodically and automatically identify structured objects in the UI, their attributes, and their values. As another example, system 100 may trace system events associated with a particular test steps by implementing a thread event monitor that monitors threads for a creation of an object, the run of an object, the termination of an object, and the like, and associate the creation, run, and/or termination of objects to a particular test event based on thread and object identifiers.

Process 400 may also include assigning the metadata as vertices connected to the backbone (step S440). For example, system 100 may determine the elements of the backbone and may assign metadata (e.g., data points) traced to each particular element (e.g., each test step). For example, system 100 may trace the metadata based on time-relations (e.g., the event happened after a particular test step or based on another suitable methodology (e.g., coloring network packets to trace them to a server code).

Process 400 may also include assigning tags to the directed edges to identify a type of relation between the vertices (step S450). In some implementations, system 100 may assign tags to the directed edges based on data received from the agents installed on the various physical or virtual system components. For example, the agents may include instructions, that when executed by a processor, compare an event occurring with the system to a list of rules. If the event matches a particular rule, the agent notes the tag association between events. For example, assume that the list of rules includes a use tagging rule that requires tagging a directed edge as "use" when a test step involves the usage of a browser. When a test step is executed that invokes an object named "browser," the agent may compare the invocation of the object to the list of rules and, based on the use tagging rule in the list, tag the directed edge as "use."

Process 400 may also include storing the DAG (step S460) in a storage device. In some implementations, the DAG may be stored in a storage device such as a non-transitory computer-readable storage medium, such as a machine-readable storage medium in potential test action device 110, repository 130, and/or in another device. After the data points have been categorized (step S410), the backbone of the DAG has been assigned (step S420), the remaining data points are connected (step S430), the metadata has been assigned as vertices (step S440), the tags have been assigned to the directed edges (step S450), and/or the DAG has been stored (step S460), process 400 may end (step S475).

Figure 5:
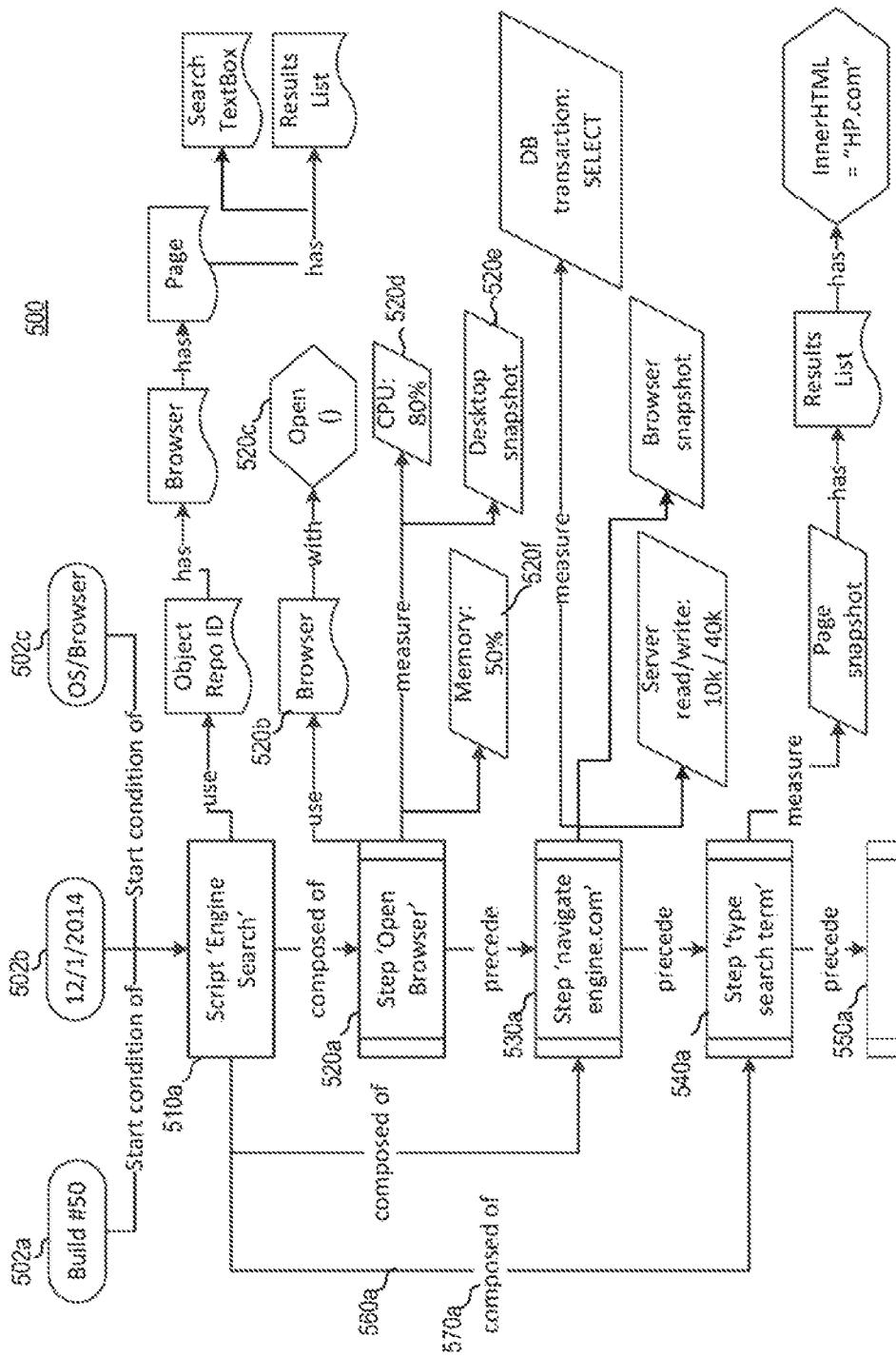
FIG. 5 is a block diagram of an example directed acyclic graph ("DAG") consistent with disclosed implementations.

FIG. 5 is an example of a block diagram of a DAG 500 consistent with disclosed implementations. For example, DAG 500 may represent data points captured during test executions of an AUT that have been correlated based on a sequence of events that occurred during a particular test execution. Although the example DAG 500 is described below as being managed by, updated by, and/or otherwise utilized by system 100 of FIG. 1 and/or specific components of system 100, other suitable systems and devices for managing, updating, and/or otherwise utilizing DAG 500 may be used. For example, processes described below as being performed by potential test action device 110 may be performed by potential test action device 210, potential test action device 310, and/or any other suitable device. Processes performed with respect to DAG 500 may be implemented in the form of executable instructions stored on a machine-readable storage medium and/or by electronic circuitry As shown in FIG. 5, DAG 500 may include data related to one or more particular test executions of an AUT. As shown in FIG. 5, the data includes data points related to application data 502a (e.g., build number), test data (e.g., the date of the test) 502b, and environment data 502c (e.g., operating system and browser type). DAG 500 also it a backbone (the collective of test steps 510*a*, 520*a*, 530*a*, 540*a* and 550*a*) which serves as the anchor for each of the vertices in the DAG. In some implementations, each data point may be considered to be a node within the DAG and may be classified based on the categorization of the particular data points (e.g., a backbone node (e.g., a test action node), an application action node, and the like). In this example, the backbone is comprised of test steps performed during test executions of the AUT, but DAGs consistent with disclosed implementations may use any suitable categorization of the data points as the backbone. For example, the backbone may be comprised according to user actions, recorded AUT web pages, UI objects, and/or any other suitable categorization.

The backbone of DAG 500 is correlated based on a sequence of events that occurred during the particular test execution, and thus the backbone links various ones of test steps 510*a*, 520*a*, 530*a*, 540*a*, and 550*a* together. In the example shown in FIG. 5, test step 510*a* occurred before test step 520*a*, test step 520*a* occurred before test step 530*a*, test step 530*a* occurred before test step 540*a*, and test step 540*a* occurred before test step S550*a*. Each portion of the backbone (e.g., each test step) in this example is connected via directed edges (only directed edge 560*a* has been labelled for clarity) from the first test step 510*a* of the test steps to the last test step 550*a* of the test steps, and the directed edges have been tagged (only tag 570*a* has been labelled for clarity) to identify a type of relation between the vertices. For example, test step 510*a* is directly linked with test steps 520*a*, 530*a*, and 540*a* via the directed edges, and the cause and/or effect of the linkage is shown in the tagging. For example, test step 510*a* is composed of test steps 520*a*, 530*a*, and 540*a*, test step 520*a* precedes test step 530*a*, test step 530*a* precedes test step 540*a*, and test step 550*a* precedes test step 540*a*.

Furthermore, each test step in DAG 500 has additional information that was captured from the testing and/or application environment and was correlated with the particular test step. This additional information (e.g. metadata) has been assigned as vertices (only vertices 520*b*, 520*c*, 520*d*, 520*e*, and 520*f* have been labelled for clarity) connected to the backbone. For example, test step 520*a* relates to opening a browser. In this case, the step of opening the browser included using the browser (an object) and it was used with a specific action (in this case open). Thus, during this particular test execution state the browser was automatically opened by calling the open function of the browser. This information is modelled in DAG 500 not only by linking the test actions and what follows in terms of the AUT and its environment, but also by the tags that indicate the conceptual meaning of those steps. Each test action and the linking of the actions that follow in response to the test action in terms of the AUT and its environment may be considered to be a node chain of the DAG. Thus, in some implementations, there may be a node chain for each test action performed during the test execution.

FIG. 6 is a flow chart of an example process 600 for determining potential test actions consistent with disclosed implementations. Although execution of process 600 is described below with reference to system 100 of FIG. 1 and/or specific components of system 100, other suitable systems and devices for execution of at least one step of process 600 may be used. For example, processes described below as being performed by potential test action device 110 may be performed by potential test action device 210, potential test action device 310, and/or any other suitable device. Process 600 may be implemented in the form of executable instructions stored on a machine-readable storage medium and/or in the form of electronic circuitry.

Process 600 may start (step S605) after a verification input of a verification execution sequence is accessed. For example, a user may utilize system 100 to compose a test made of a plurality of test actions and/or associated application actions performed in a particular order. The composition of the test may be performed by inputting at least one verification input to define the test composition. This verification input may include at least one of test action verification information (e.g., information to verify a test action) and application action verification (e.g., information to verify an application action). For example, the verification input may be a series of conditional statements, questions, or any other suitable input. The order in which the test actions and/or the associated application actions are to be performed during the test may be considered to be the verification execution sequence. Thus, in some examples, a verification execution sequence may include steps related to a plurality of verification inputs.

In some implementations, the verification input may be entered into the user interface using a domain-specific language (e.g., a computer language specialized to potential test action device 110) and/or any other input (e.g., natural language) that may be translated by potential test action device 110 into a DAG verification query (e.g., a query capable of obtaining relevant information from a DAG, such as DAG 500 of FIG. 5) using a domain-specific language. In some implementations, the domain-specific language may be similar to behavior-driven-development syntax.

Process 600 may include determining the potential test action by querying a DAG based or the verification input (step S610). For example, in response to receiving the verification input, test verification engine 240 may query a verification repository, such as verification repository 130, to obtain data related to the correlated captured data points that are responsive to the query. For example, test verification engine 340 may query the verification repository using one or more of the processes and/or components discussed above, and may receive the data that is responsive to the query.

In some implementations, process 600 may include receiving, in response to the query, data indicating that the verification input is not included in the DAG (step S620). In some implementations, the data indicating that the verification input is not included in the DAG may be an empty set of results. For example, test verification engine 340 may identify a matching test action node in a DAG, determine if the matching test action node includes a corresponding application action node, and identify the potential test action node based on the verification input if the DAG does not include at least one of the matching test action node and the corresponding application action node. An example of these processes are described in further detail below with respect to, for example, FIG. 7.

Process 600 may include causing the generation of a visualization of the potential test action (step S630). In some implementations, test verification engine 340 may cause the generation of a visualization including a representation of the verification execution sequence and the potential test action within the verification execution sequence. For example, the visualization may include graphics representing matching test action nodes and corresponding matching application actions nodes in the verification execution sequence, and may display a graphic representing the potential test action differently from the graphics representing the matching test action nodes and/or the corresponding matching application action nodes (e.g., in a different color, a different size, a different pattern, and/or any other suitable method of differentiating between potential test actions and other actions). An example of a visualization including a representation of the verification execution sequence and a potential test action within the verification execution sequence is discussed in greater detail below with respect to, for example, FIG. 8.

Process 600 may include causing storage of the verification execution sequence as a potential test action verification (step S640). In some implementations, test verification engine 340 may cause the storage of the verification execution sequence (e.g., a sequence of verification inputs representing DAG verification queries) as a potential test action verification in a repository, such as repository 130. The verification repository may include a number of stored potential test action verifications, where each of the stored potential test action verifications are defined before a future test execution of the AUT that actually performs the potential test action. Thus, in this example, the potential test action verification may be stored before the future test execution is executed.

Process 600 may it causing the automatic execution of the potential test action after a future test execution) (step S650). For example, test verification engine 340 may cause the automatic execution of at least one of the potential test action verifications stored in, for example, repository 130, after future test executions (e.g., test executions where data has not been captured and/or correlated) have been performed. In some implementations, the potential test action verification may be automatically executed at a particular point in time. For example, the particular point in time may be based on a schedule, based on new data being captured and/or correlated by system 100, and/or based on any suitable method of identifying the particular point in time.

Process 600 may include causing the generation of a notification if the potential test action is performed during the future test execution (step S660). For example, if the future test execution performs the potential test action (e.g., data has been captured/correlated is returned as a result of executing the potential test action), test verification engine 340 may cause the generation of an alert to be displayed on a display device. The alert may contain information regarding the difference between the verification input and the data included in the DAG. In some examples, test action verification engine 340 may remove the potential test action verification from repository 130, and the alert may include information that the potential test action verification has been removed. Additionally, the alert may be displayed in the same interface (e.g., a test verification interface) as the visualization of the potential test action, and test action verification engine 340 may modify the graphic related to the potential test action to indicate that the potential test action has been performed. For example, test action verification engine 340 may modify the graphic related to the potential test action to be the same as the graphic(s) related to the matching test action node and/or the corresponding matching application action node. Once one or more of steps S610, S620, S630, S640, S650, and S660 have been performed, process 600 may end (step S675).

FIG. 7 is a flow chart of an example process 700 for identifying potential test actions consistent with disclosed implementations. Although execution of process 700 is described below with reference to system 100 of FIG. 1 and/or specific components of system 100, other suitable systems and devices for execution of at least one step of process 700 may be used. For example, processes described below as being performed by potential test action device 110 may be performed by potential test action device 210, potential test action device 310, and/or any other suitable device. Process 700 may be implemented in the form of executable instructions stored on a machine-readable storage medium and/or in the form of electronic circuitry.

Process 700 may start (step S705) after test executions of an AUT have been performed. For example, process 700 may start after data points during historical test executions have been captured and correlated using, for example, the methods described above. Process 700 may include identifying, based on the test action verification information, a matching test action node (e.g., a test action node in the DAG that matches the test action represented by test action verification information) (step S710). In some implementations, test verification engine 340 may identify the matching test action node by causing the execution of a query of repository 130. For example, the query may be used to identify test actions in historical test executions of the AUT that are the same as test actions represented by the test action verification information. For example, test verification engine 340 may identify the matching test action node based on a sequence of events in the verification execution sequence. For example, test verification engine 340 may search DAG 500 to identify test actions that were performed in the same sequence as the test actions represented by the verification input in the verification execution sequence. As another example, the matching test action node can be identified based on various filtering methods. The filters may be applied to the query by a user of system 100, and may include any suitable information to limit results, such as environment configuration, application build number, tester name, and the like.

Process 700 may also include determining, based on the application action verification information, if the matching test action node includes a corresponding matching application action node in the DAG (step S720). For example, in some implementations the verification input may include (but need not include) both test action verification information and application action verification information. In some examples, if the verification input includes application action verification information, test verification engine 340 may determine the corresponding application action node by executing a new query of the DAG (e.g., a second query) to identify data that matches the application actor verification information. For example, test verification engine 340 may query the DAG to identify instances of matching test actions in historical test executions of the AUT that had the same corresponding application action and/or were performed in the same order as the order of the verification execution sequence. In other examples, test verification engine 340 need not execute separate queries, and may instead use a single query to obtain information from the DAG (e.g., a query that requested information on both matching test action nodes and corresponding matching application action nodes).

Process 700 may include identifying the potential test action based on the verification input if the DAG does not include at least one of the matching test action application nodes and the corresponding matching application action nodes (step S730). Consider the case where a particular test action has not been performed by testers of the AUT and/or where the corresponding application action was not performed. In this (and other) examples, data associated with these actions may not be present in the DAG (i.e., if an action was not performed, there would be no data associated with that action that can be captured and/or correlated). Thus, in some examples, the query may return an empty set of results, indicating that the test action has not been performed. In response to the return of an empty set of results, test verification engine 340 may identify the verification input as related to a potential test action. Once at least one of processes S710, S720, and S730 have been performed, process 700 may end (step S745).

Figure 8:
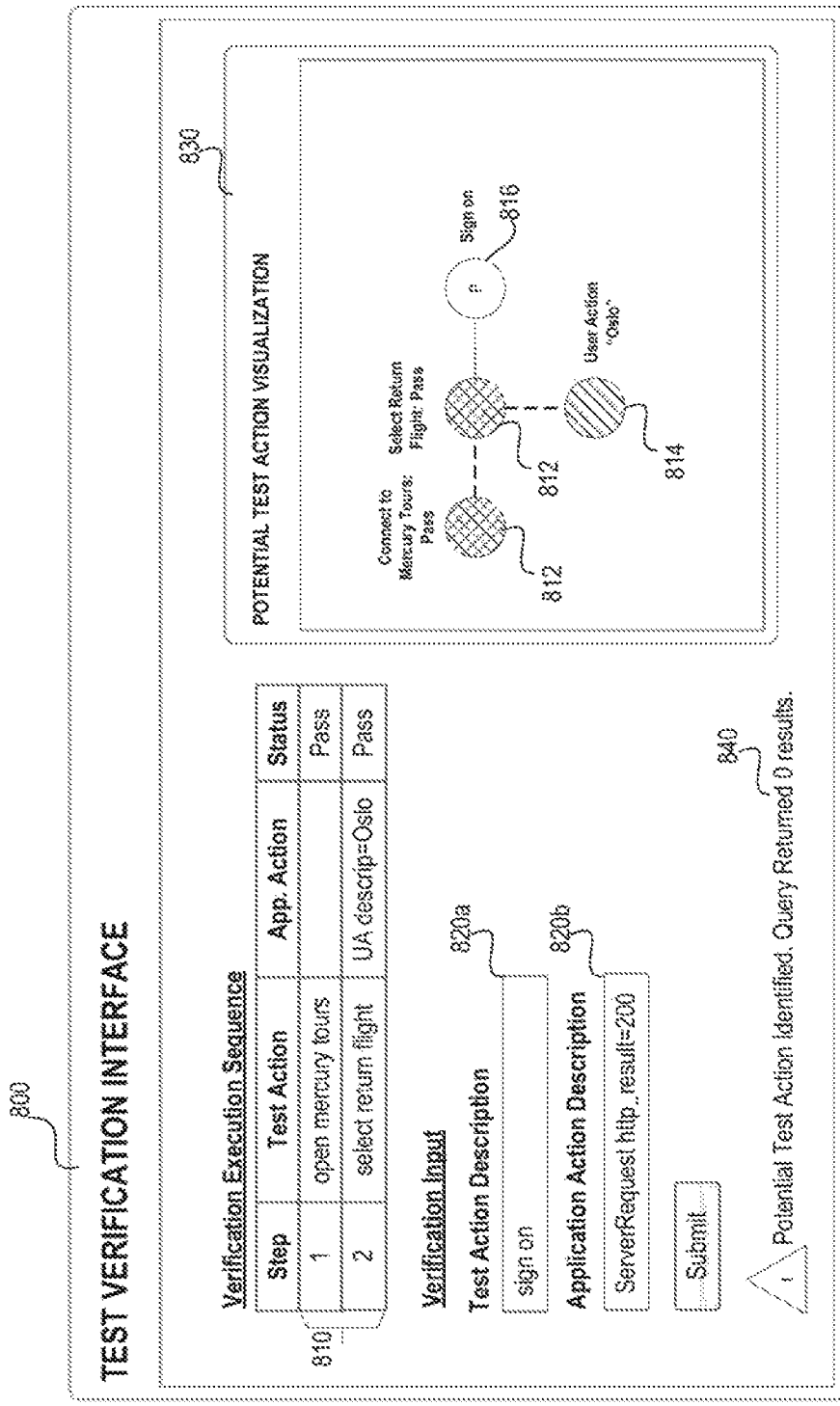
FIG. 8 is an illustration of an example test verification interface consistent with disclosed implementations.

FIG. 8 is an illustration of an example test verification interface 800 consistent with disclosed implementations. In some implementations interface 800 may be generated by potential test action device 110 using data obtained from, for example, a non-transitory machine-readable medium, repository 130, and/or another device or system. For example, potential test action device 110 may obtain information related to the correlated data points stored in repository 130 using the methods described above. In some implementations, potential test action device 110 may cause the display of interface 800 on a display device, such a display device associated with client device 120.

As shown in FIG. 8, interface 800 may include a verification execution sequence area 810 for displaying information related to a verification execution sequence, verification input areas 820a, 820b for displaying and/or receiving verification input, a potential test action visualization area 830 for displaying a visualization of a potential test action, and a potential test action indication area 840 for displaying an indication that the verification inputs not included in the queried DAG. As shown in FIG. 8, interface 800 may display information in one or more of areas 810, 820, 830, and 840 as text, graphics, or a combination of text and graphics in a way that aids the user in determining potential test actions.

In the example shown in FIG. 8, and as described above, verification execution sequence area 810 may function to display it related to a verification execution sequence in a test composition. For example, as shown in FIG. 8, the first step of the verification execution sequence includes a verification of the test action of opening mercury tours. No associated application action verification is requested in the example shown in FIG. 8. Additionally, the second step of the verification execution sequence includes a verification of the test action of selecting a return flight with an associated application action of displaying a return flight related to "Oslo."

One of more of the verifications shown in verification execution sequence 810 may have been input by a user into verification input areas 820a, 820b. For example, test action information could be input into verification input area 820a, and application action information could be input into verification input area 820b. In the example shown in FIG. 8, the verification input related to the test action "sign on" is not present. Accordingly, system 100 may determine that the test action "sign on" is a potential test action using the methods described above, and may display information in potential test action indication area 840 that indicates that the verification input related to "sign on" returned no results.

Potential test action visualization area 830 may function to display information about completed verifications in the verification execution sequence, as well as potential test actions in the verification execution sequence. In the example shown in FIG. 8, there are graphics 812a, 812b representing two matching test action nodes (representations of verifications 1 and 2, respectively) and a graphic 814 representing matching application action node 814 (representing verification 2). Furthermore, the potential test action of "sign on" is graphically represented differently from the matching test action nodes and the matching application action node. As described above, a graphic representing the potential test action node, such as graphic 816, may be a different color, size, shape, and the like from graphics representing the matching test action node and/or the corresponding matching application action node.

Figure 9:
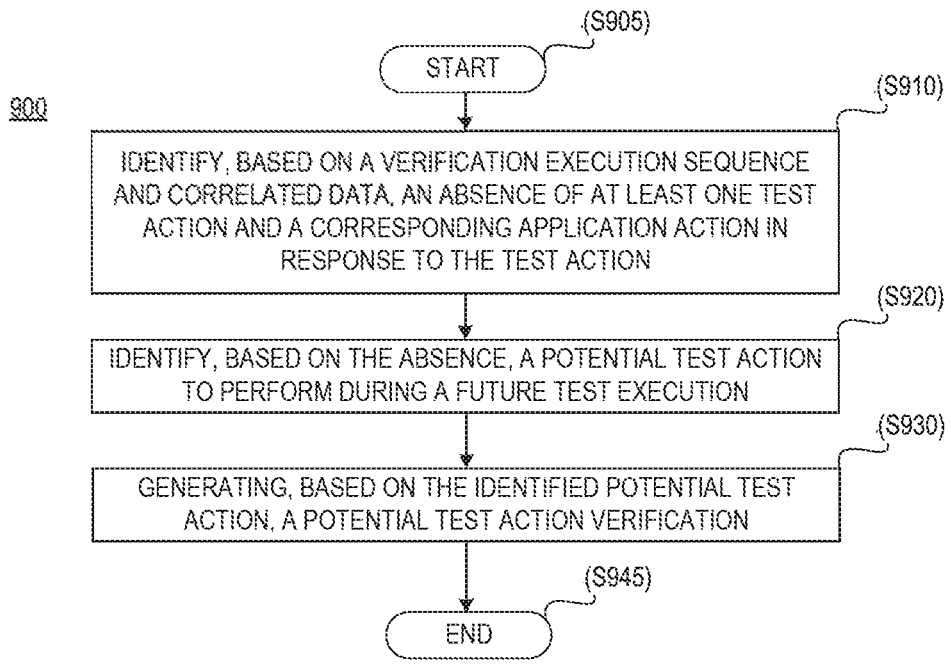
FIG. 9 is a flow chart of an example process for determining potential test actions consistent with disclosed implementations.

FIG. 9 is a flow chart of an example process 900 for determining potential test actions consistent with disclosed implementations. Although execution of process 900 is described below with reference to system 100 of FIG. 1 and/or specific components of system 100, other suitable systems and devices for execution of at least one step of process 900 may be used. For example, processes described below as being performed by potential test action device 110 may be performed by potential test action device 210 potential test action device 310, and/or any other suitable device. Process 900 may be implemented in the form of executable instructions stored on a machine-readable storage medium and/or in the form of electronic circuitry.

Process 900 may start (step S905) after test executions of an AUT have been performed. For example, process 900 may start after the data points during the test executions have been captured and correlated using, for example, the methods described above. Process 900 may include identifying, using a test verification engine and based on correlated data, an absence of at least one of a test action performed in a verification execution sequence and a corresponding application action performed in response to the test action (step S910). For example, test verification engine 340 may determine whether a test action and/or corresponding application action represented by verification input (and included in the verification execution sequence) is not included in the correlated data. In some implementations, the correlated data may be captured during historical test executions of the AUT, and the test verification engine may identify the absence of the at least one of the test action and the corresponding application action using at least one of the methods described above.

Process 900 may also include identifying, using the test verification engine and based on the absence, a potential test action to perform during a future execution of the AUT (step S920). For example, test verification engine 340 may identify the potential test action to perform as the test action and/or application action that is absent in the correlated data. For example, test verification engine 340 may identify the potential test action based on the verification input and using at least one of the methods described above.

Process 900 may also include generating, using the test verification engine and based on the identified potential test action, a potential test action verification to be executed during a future test execution of the AUT (step S930). For example, test verification engine 340 may identify a particular verification execution sequence as including a potential test action and may automatically generate code to automatically verify the potential test action during a future test execution. For example, the code may be generated to include DAG queries that will query the DAG during certain periods of time or in response to certain events. In some examples, the code may include instructions that when executed by a processor (e.g., processor 220), may cause the generation of a notification that the potential test action has been performed during the future test execution. The generation of the notification may be caused in response to automatically verifying the potential test action. Once one or more of steps S910, S920, and S930 are complete, process 900 may end (step S945).

Figure 10:
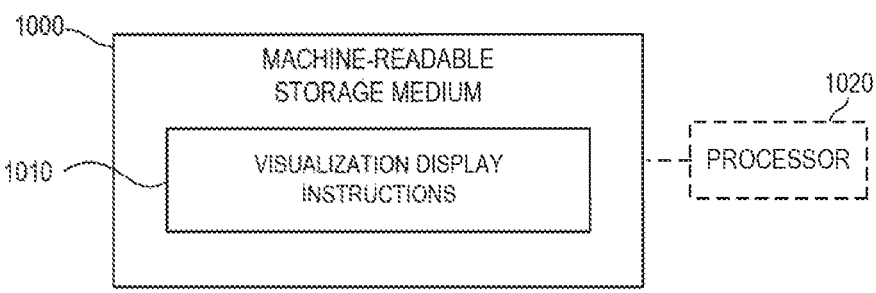
FIG. 10 is a block diagram of an example machine-readable storage medium consistent with disclosed implementations.

FIG. 10 is a block diagram of an example machine-readable storage medium 1000 consistent with disclosed implementations. In certain aspects, machine-readable storage medium 1000 may correspond to storage devices associated with system 100, potential test action device 210, potential test action device 310, and/or any other suitable device or system. Machine-readable storage medium 1000 may be any electronic, magnetic, optical, or other physical storage device that stores executable instructions. Thus, machine-readable storage medium 1000 may be, for example, memory, a storage drive, an optical disc, and the like. In some implementations, machine-readable storage medium 1000 may be a non-transitory machine-readable storage medium, where the term "non-transitory" does not encompass transitory propagating signals. Machine-readable storage medium 1000 may be encoded with instructions that, when executed by processor 1020 (e.g., a processor that is the same or similar to processor 210 of FIG. 2 and described above), perform operations consistent with disclosed implementations. For example, machine-readable storage medium 1000 may include instructions that perform operations to cause a display of a visualization of a potential test action to perform during a future test execution of an application under test. In some implementations, machine-readable storage medium 1000 may include visualization display instructions 1010 that, when executed by processor 1020, may cause the generation of a visualization including a representation of a verification execution sequence and the potential test action within the verification execution sequence. For example, visualization display instructions 1010 may cause the display of a test verification interface, such as test verification interface 800 shown in FIG. 8.

The potential test action in the visualization may be identified using at least one of the methods described above. For example, the potential test action may be identified based on identifying an absence of at least one of a test action data point and a corresponding application action data point that match a verification input. As another example, the at least one of the test action data point and the corresponding application action data point may have been captured during historical test executions of the AUT, and may have been correlated based on sequences of events that occurred during the historical test executions. As yet another example, the visualization may be modified if the potential test action is performed during a future test execution of the AUT. For example, as described above, a graphic representing the potential test action may be modified to resemble a graphic of a matching test action node and/or a graphic representing the corresponding matching application action node. As another example, the visualization may be modified to show a notification, such as an alert.

The disclosed examples may include systems, devices, machine-readable storage media, and methods for determining potential test actions. For purposes of explanation, certain examples are described with reference to the components illustrated in FIGS. 1-3 and 10. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are used to distinguish one element from another.

Further, the sequence of operations described in connection with FIGS. 1-10 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order, including those described with respect to FIGS. 1-10. Thus, the present disclosure merely sets forth possible examples of implementations, and many variations and modifications may be made to the described examples. All such modifications and variations are intended to be included within the scope of this disclosure and protected by the following claims.

We claim:

1. A system comprising:
a processor; and
a non-transitory storage medium storing instructions executable on the processor to:
capture data points during test executions of an application under test, the data points including test action data and application action data;
generate a representation of test actions and associated application actions based on correlating each of the data points with a particular test execution of the test executions, each of the data points being correlated based on a sequence of events that occurred during the particular test execution;
determine, by querying the representation with a query that represents an execution sequence comprising a test action and an associated application action, a potential test action to perform during a further test execution of the application under test and
execute the potential test action during the further test execution of the application under test,
wherein the representation comprises a directed acyclic graph generated based on timestamps associated with the data points and including a plurality of test action nodes representing the test actions and a plurality of application action nodes representing the associated application actions; and
the instructions are executable on the processor to:
determine the potential test action by querying the directed acyclic graph based on the query, and receiving, in response to the query, data indicating that the test action and the associated application action represented by the query is not included in the directed acyclic graph.

2. The system of claim 1, wherein the query comprises a verification input including test action verification information to verify the test action, and application action verification information to verify the associated application action.

3. The system of claim 2, wherein the instructions are executable on the processor to determine the potential test action by:
determining, based on the test action verification information, whether a matching test action node is in the directed acyclic graph;
determining, based on the application action verification information, whether a matching application action node is in the directed acyclic graph; and identifying the potential test action based on the query in response to determining that the directed acyclic graph does not include the matching test action node and the matching application action node.

4. The system of claim 3, wherein the matching test action node is identified based on a sequence of events in the execution sequence of the query.

5. The system of claim 1, wherein the instructions are executable on the processor to cause generation of a visualization of the potential test action, the visualization including a representation of the execution sequence and the potential test action within the execution sequence.

6. The system of claim 1, wherein the instructions are executable on the processor to cause storage of the execution sequence as a potential test action verification.

7. The system of claim 6, wherein the instructions are executable on the processor to cause generation of a notification if the potential test action is performed during the further test execution.

8. The system of claim 6, wherein the potential test action verification is stored before the further test execution is executed.

9. A method performed by a system comprising a hardware processor, comprising:
generating a representation of test actions and associated application actions based on correlating data points captured during test executions of a program under test;
identifying, responsive to querying the representation with a query that represents a verification execution sequence comprising a test action and an associated application action performed in response to the test action, an absence, in the representation, of the test action and the associated application action of the verification execution sequence;
identifying, based on identifying the absence, a potential test action to perform during a further test execution of the program under test;
generating, based on the identified potential test action, a potential test action verification to be executed during the further test execution of the program under test; and
executing the potential test action verification during the further test execution of the program under test.

10. The method of claim 9, wherein generating the potential test action verification includes automatically generating code that automatically verifies the potential test action during the further test execution.

11. The method of claim 10, wherein the code includes instructions to generate, in response to automatically verifying the potential test action, a notification that the potential test action has been performed during the further test execution.

12. The method of claim 9, wherein the verification execution sequence represented by the query comprises an order of a plurality of test actions and associated application actions.

13. A non-transitory machine-readable storage medium comprising instructions that when executed, cause a system to:
generate a representation of test actions and associated application actions based on correlating data points captured during test executions of a program under test;
identify a potential test action to perform during a further test execution of the program under test, wherein the potential test action is identified by identifying an absence of a test action and an associated application action in the representation based on querying the representation with a query that represents an execution sequence comprising the test action and the associated application action;
cause display of a visualization including a representation of a verification execution sequence comprising the potential test action; and
execute the potential test action during the further test execution of the program under test.

14. The non-transitory machine-readable storage medium of claim 13, wherein the instructions cause the system to modify the visualization in response to determining that the potential test action is performed during the further test execution.

15. The non-transitory machine-readable storage medium of claim 13, wherein the execution sequence represented by the query comprises an order of a plurality of test actions and associated application actions.

* * * * *